3,223,696
POLYMERIZATION EMULSIFIERS COMPRISING A SOAP OF DISTILLED ROSIN AND AN OIL
Francis J. Boylan, 2511 McCawber Drive, Limestone Gardens, and Stearns T. Putnam, 4913 Old Hill Road, Sedgely Farms, both of Wilmington, Del.
No Drawing. Filed Feb. 18, 1963, Ser. No. 259,347
6 Claims. (Cl. 260—97)

This invention relates to improved emulsifiers and their use in synthetic rubber production, as well as to the resins from which these emulsifiers are made and the process for making them.

In the manufacture of synthetic rubber, e.g., styrene butadiene rubber, by aqueous emulsion polymerization, premature coagulation of latex is a continuing problem. Separation of rubber (prefloc) from the latex during polymerization and during recovery of monomers often results in fouling of reactors and plugging of columns and lines which necessitates costly shutdowns. It would be highly advantageous to eliminate or at least substantially reduce premature coagulation of latexes in such processes.

The present invention is based on the discovery that soaps of distilled stabilized rosins and blends of distilled stabilized rosins with substantially neutral oils give improved latex stability and less prefloc formation than the corresponding soaps based on undistilled rosins.

Now, in accordance with the invention, a stabilized rosin, e.g., a dehydrogenated or disproportionated rosin, is subjected to distillation under reduced pressure to remove therefrom, as a distillation residue, from about 3% to about 20% of a high-boiling or nonvolatile fraction and to recover, as a distillate, the remainder of the stabilized rosin. The distilled stabilized rosin, so obtained, can be utilized directly in emulsifiers for the preparation of synthetic rubber but is preferably first blended with a substantially neutral oil to provide greater resistance to crystallization.

Having described the invention generally, the following examples are given to illustrate specific embodiments thereof. In these examples, the prefloc test procedure utilized involved making bottle polymerizations in an SFS (Sodium Formaldehyde Sulfoxylate) 5° C. recipe containing no auxiliary emulsifier (Tamol N). The prefloc test recipe used is shown below along with a standard recipe.

The polymerizations were shortstopped at 60% conversion on the basis of conversions on samples taken every two hours. The bottles were then rotated in a 5° C. bath for an additional 16 hours, each bottle then pressurized to 15 p.s.i. with nitrogen, placed neck down, and the latex drained through a No. 14 hypodermic needle onto a 100-mesh stainless steel screen. The fine coagulum retained on the screen was washed with distilled water until the filterate was clear, dried and weighed. The amount of coagulum remaining in each bottle was transferred to a 100-mesh stainless steel screen, washed, dried and weighed. Filtered latexes from duplicate or triplicate bottles were combined and the pH of the composite determined. The amount of prefloc separating from the filtered latex composites on standing for various lengths of time (usually 24 hours) was also checked. Test results are expressed as percent of total dry polymer which separates ("on screen," plus "in bottles," plus "on standing") as prefloc.

| Ingredient | Parts/100 parts monomers | |
|---|---|---|
| | Standard recipe | Prefloc recipe |
| Butadiene | a 75 | a 75 |
| Styrene | b 25 | c 25 |
| Water | 200 | 180 |
| Emulsifier, dry basis | 4.5 | 4.5 |
| Na₃PO₄.12H₂O | 0.5 | |
| K₃PO₄ | | 0.4 |
| Tamol N (Sodium salt of the sulfonic acid derivative of a naphthalene and formaldehyde condensate) d | 0.1 | |
| Sulfole | 0.220 | 0.20 |
| Paramethane hydroperoxide | 0.040 | 0.044 |
| FeSO₄.7H₂O | 0.020 | 0.015 |
| Versene 9 (Trisodium salt of ethylene diamine tetraacetic acid) | 0.0294 | |
| Sequestrene S.T. (Tetrasodium salt of ethylene diamine tetraacetic acid) | | 0.024 |
| Sodium formaldehyde sulfoxylate | 0.036 | 0.041 |
| KOH added to adjust pH of soap-electrolyte solution | (e) | (f) |
| Shortstop: | | |
| (KDD) Potassium dimethyl dithiocarbamate | 0.147 | |
| (SDD) Sodium diemthyl dithiocarbamate | | 0.12 |
| Polyamine H [straight and branched chain alkylene polyamines (60%) and heterocyclic amines (40%)] | 0.066 | 0.02 | a Special purity grade, 99.5–99.6 mole percent, distilled from cylinder before using.
b Styrene PL–12–T grade, alkali washed.
c Recycle styrene, purity 87.6%.
d The auxiliary emulsifier, Tamol N, was omitted in the prefloc recipe to increase the tendency to prefloc formation.
e Yes, to pH 11.0.
f Yes, to pH 10.5.

EXAMPLE 1

A sample of a commercial disproportionated rosin (typical analysis A.N. 152–158; abietic acid, 0.0%; dehydroabietic acid, 45–55%) was purified by dissolving the rosin in aqueous NaOH and extracting the neutral fraction with hexane. Both acid and neutral fractions were recovered in the usual way to give the following fractions (loss 3.1%):

A.N.
Fraction A, resin acids 82.6% _____ 179
Fraction N, resin neutrals 14.3% _____ 2.4

Part of the acid fraction (A) was distilled at 0.1–0.25 mm. of mercury to give the following fractions (loss during distillation was 0.8%):

| | Fraction DA Distilled acids 91.1% | Fraction R Residue 8.1% |
|---|---|---|
| A.N. | 185 | 131.4 |
| DEG Sap. No | 185.5 | 159 |
| MDR, Percent | 0.4 | 93.5 |

Portions of fractions (A) and (DA) and a 90:10 blend of (DA) and (R) were converted to soaps by dissolving the appropriate fraction or blend in dilute aqueous potassium hydroxide and boiling until the acids dissolved. The solution was cooled and the pH adjusted to about 10.5 with potassium hydroxide. The solution was reboiled, cooled and then adjusted to pH 10.5 and soap concentration of 2.34% with dilute potassium hydroxide. These soaps were evaluated in the above-described prefloc recipe utilizing the described procedure in comparison with an emulsifier made by the same procedure from the same commercial form of disproportionated rosin referred to above. The test results are shown in Table 1 below.

Table 1

Emulsifier, potassium soap of: 0.36
part TSP (trisodium phosphate)
100 parts monomers—

| | Prefloc percent of dry polymer |
|---|---|
| Commercial disproportionated rosin | 1.01 |
| Fraction A | 3.00 |
| Fraction DA | 0.40 |
| 90% fraction DA } 10% fraction R | 5.76 |

EXAMPLE 2

Potassium soaps of a portion of fraction (DA) prepared as in Example 1 were compared with a commercial emulsifier (A.N. 18–20; T.S. 79–81) comprising the potassium soap of the commercial disproportionated rosin described in Example 1 utilizing the above-described procedure and prefloc test recipe with the following exception; viz, the amount of potassium soap of fraction (DA) was changed to 3.8 parts per 100 parts monomer to give about the same polymerization rate. The test results are shown in Table 2 below.

Table 2

| Emulsifier: | Prefloc percent of dry polymer |
|---|---|
| Commercial emulsifier | 1.13 |
| Potassium soap of fraction DA | 0.37 |

EXAMPLE 3

A comparison was made between a commercial emulsifier of the type used in Example 2 and potassium soaps of fraction (A) of Example 1 and mixtures of fraction (A) and fraction (N) of Example 1 using the above-described prefloc test recipe and procedure. These results, which are summarized in Table 3 below, show no adverse effect of neutrals on prefloc formation.

Table 3

| Emulsifier: | Prefloc percent of dry polymer |
|---|---|
| Commercial emulsifier (4.5 parts) | 2.75 |
| Potassium soap of 3.7 parts of fraction A (4.1 parts)[1] | 5.10 |
| Potassium soap of 3.7 parts of fraction A plus 0.4 part of fraction N (4.5 parts)[1] | 3.10 |
| Potassium paste soap of 3.7 parts of fraction A plus 0.4 part of fraction N (4.5 parts) | 2.68 |

[1] Prepared as described in Example 1.

EXAMPLE 4

A sample of commercial disproportionated rosin like that utilized in Example 1 was distilled under vacuum to give 84.7% of a distillate fraction (DA) (A.N. 168) and 11.2% of a distillation residue (R). The fraction (DA) was converted to a potassium paste soap (A.N. 12; T.S. 60%) and compared as emulsifier with a commercial emulsifier of the type described in Example 2 utilizing the prefloc test recipe and procedure described above. The results are set forth in Table 4 below.

Table 4

| Emulsifier: | Prefloc percent of dry polymer |
|---|---|
| Commercial emulsifier | 2.64 |
| Potassium soap of fraction DA | 0.57 |

EXAMPLE 5

A sample of disproportionated rosin (A.N. 159.0, Sap. No. 166.1, Molecular distillation residue [MDR] 8.0%) was distilled to yield 88–90% distillate (distilled disproportionated rosin) and 10–12% residue. Acid number of the distillate was 170. Potassium paste soaps were prepared from a sample of the undistilled disproportionated rosin and from the distilled disproportionated rosin and various mixtures thereof with a naphthenic-type rubber processing or extender oil (Gulf Oil 561) containing 0.7% group 1 unsaturates, 33.2% group 2 unsaturates and 64.4% saturates, as determined by the Rostler method of analysis. The procedure used to make these soaps involved addition of molten resin (or resin-oil blend) to hot aqueous KOH with vigorous agitation. These paste soaps were evaluated as emulsifiers in the aqueous emulsion polymerization of butadiene-1,3-styrene mixtures utilizing the above-described prefloc recipe and procedure. The results are set forth in Table 5 below.

Table 5

| Emulsifier, potassium paste soap of: | Prefloc percent of dry polymer |
|---|---|
| Disproportionated rosin | 0.99 |
| Distilled disproportionated rosin | 0.58 |
| 91% distilled disproportionated rosin—9% oil | 0.50 |
| 88% distilled disproportionated rosin—12% oil | 0.63 |

EXAMPLE 6

A sample of distilled disproportionated rosin was prepared by first extracting the neutrals from a disproportionated rosin having an analysis similar to the disproportionated rosin in Example 5 and then distilling the acid fraction as described in Example 5 to remove 8.1% of a high-boiling or undistillable portion and recover 91.0% of distilled resin acids. The analysis of these distilled resin acids was: A.N. 185.0, Sap. No. (DEG) 185.5, and MDR 0.4%. Dilute solutions of the potassium soaps of these distilled resin acids and mixtures of same with the same type of oil used in Example 5 were made and evaluated as emulsifiers in comparison with a commercial emulsifier similar to that in Example 2 utilizing the above-described recipe and procedure. The results are summarized in Table 6 below.

Table 6

| Emulsifier: | Prefloc percent of dry polymer |
|---|---|
| Commercial emulsifier | 1.16 |
| Potassium soap of distilled resin acids | 0.63 |
| Potassium soap of 91% distilled resin acids—9% oil | 0.52 |
| Potassium soap of 88% distilled resin acids—12% oil | 0.74 |

EXAMPLE 7

Samples of the potassium soaps of a disproportionated rosin [a commercial emulsifier (A.N. 11–13; T.S. 79–81%) prepared from the same type of commercial disproportionated rosin described in Example 1], a distilled disproportionated rosin similar to that of Example 5, and mixtures of this distilled disproportionated rosin with the same type of oil used in Example 5 were compared as emulsifiers utilizing the above-described recipe and procedure. The results are set forth in Table 7 below.

Table 7

| Emulsifier, potassium soap of: | Prefloc percent of dry polymer |
|---|---|
| Disproportionated rosin (commercial emulsifier) (4.5 parts of soap) | 0.71 |
| Distilled disproportionated rosin (4.0 parts) | 0.45 |
| 88% distilled disproportionated rosin—12% oil (4.5 parts) | 0.34 |
| 91% distilled disproportionated rosin—9% oil (4.5 parts) | 0.44 |

EXAMPLE 8

A portion of a sample of disproportionated rosin (acid number 157, dehydroabietic acid 55, MDR 7.5%) was distilled in vacuo (0.2 mm. pressure) to give an 88.5% yield of distillate (distilled disproportionated rosin—A.N. 166). The residue was 11.3% of the charge. Potassium paste soaps were prepared from a portion of the undistilled disproportionated rosin and from several blends of the distilled disproportionated rosin with the same type of oil used in Example 5, with and without the addition of partially hydrogenated tallow fatty acids. Each of these soaps was evaluated as an emulsifier utilizing the above-described recipe and procedure. The results are set forth in Table 8 below.

*Table 8*

| Emulsifier, potassium soap of— | Amount, pts./100 pts. monomers | Prefloc, percent of dry polymer |
|---|---|---|
| Disproportionated rosin | 4.5 | 1.72 |
| Distilled disproportionated rosin | 4.25 | 1.02 |
| Distilled disproportionated rosin (94.6%)—oil (5.4%) | 4.5 | 1.08 |
| Distilled disproportionated rosin (91.0%)—oil (6.0%)—hydrogenated tallow fatty acids (3.0%) | 4.5 | 1.20 |
| Distilled disproportionated rosin (91.0%)—oil (9.0%) | 4.5 | 0.95 |

EXAMPLE 9

Portions of a distillate fraction (DA), comparable to that of Example 4, alone and in admixture with various oils, were converted to potassium soaps following the procedure of Example 1 and compared as emulsifiers with a commercial emulsifier of the type described in Example 2 utilizing the prefloc test recipe and procedure described above. The results are set forth in Table 9 below.

*Table 9*

Emulsifier:                          Prefloc, Percent of dry polymer
Commercial emulsifier, 4.5 parts _____ 1.13
Potassium soap of 3.4 parts fraction DA ____ 0.37
Commercial emulsifier, 4.5 parts _____ 2.24
Potassium soap of 3.7 parts fraction DA plus 0.5 part oil [1] _____ 0.66
Commercial emulsifier, 4.5 parts _____ 1.70
Potassium soap of 3.7 parts fraction DA plus 0.5 part oil [1] _____ 0.50
Commercial emulsifier, 4.5 parts _____ 2.43
Potassium soap of 3.7 parts fraction DA plus 0.5 part hydrogenated methyl ester of rosin _____ 1.17
Commercial emulsifier, 4.5 parts _____ 1.66
Potassium soap of 3.7 parts fraction DA plus 0.5 part hydrogenated methyl ester of rosin _____ 0.67
Commercial emulsifier, 4.5 parts _____ 1.27
Potassium soap of a mixture of fraction DA (81%), distilled hydrogenated rosin [2] (13%) and oil [3] (6%), 4.5 parts _____ 0.64
Commercial emulsifier, 4.5 parts _____ 1.27
Potassium soap of a mixture of fraction DA (81%), distilled hydrogenated rosin [2] (13%) and oil [4] (6%), 4.5 parts _____ 0.55

[1] This was a white paraffinic mineral oil having a boiling point of 210°–220° C. at 100 mm. pressure.
[2] A.N. 166; Bromine No. 45.
[3] This was a naphthenic type rubber processing oil which contained 1.7% nitrogen bases and 0.7% group 1 unsaturates as determined by the Rostler method of analysis (Industrial and Engineering Chemistry, vol. 41, No. 3, pages 598–608, F. S. Rostler and Sternberg).
[4] This was a naphthenic type rubber processing oil which contained 0.0% nitrogen bases and 1.3% group 1 unsaturates as determined by the Rostler method of analysis.

It is quite evident from the examples that the distilled stabilized rosins of the invention give less prefloc formation when used as emulsifiers in aqueous emulsion polymerization processes for the manufacture of synthetic rubber than do presently available commercial emulsifiers prepared from an undistilled stabilized rosin. In the preparation of these novel resins, a stabilized rosin is subjected to distillation under reduced pressure to remove a high-boiling or nonvolatile fraction consisting of from about 3% to about 20% by weight, based on the weight of the original stabilized rosin. The remainder of the rosin is recovered as a distillate to provide the distilled stabilized rosin of the invention. It will be appreciated, of course, that a small percentage, e.g., up to about 2%, of low-boiling material (light ends) is unavoidably lost during the distillation and that such material is not recovered with the distillate. Therefore, the statement utilized in the specification and claims that the remainder of the rosin is recovered as distillate is intended to mean the remainder of the rosin minus that lost during the distillation.

The exact amount of high-boiling material removed will vary with the composition of the stabilized rosin. The amount removed is preferably from about 5% to about 12% by weight, based on the weight of the stabilized rosin. The pressure employed for the distillation should be low enough to permit distillation at a temperature which will not cause undue decomposition of the rosin during distillation. Accordingly, pressures below about 30 mm. of mercury are desirable, and it is preferable to employ a pressure of about 10 mm. or lower.

The temperature range for the distillation will depend on the pressure employed, the amount of material distilled and/or left in the residue and similar factors. In general, it has been found that when the pressure during the distillation is maintained within the range of about 0.3–0.5 mm. mercury, the distillation can be carried out satisfactorily within the temperature range of about 160° C. to about 260° C. when the measured temperature is that of the boiling liquid. These temperature limits are not critical, however, and can vary according to the purity of the stabilized rosin and other factors.

The stabilized rosins contemplated for use herein should have abietic acid contents less than about 5%, and preferably less than about 1%. These stabilized rosins can be prepared from any suitable type of rosin, e.g., wood rosin, gum rosin, and tall oil rosin, by disproportionation, by combined disproportionation and hydrogenation, by substantially complete hydrogenation, by further hydrogenation of a partially hydrogenated rosin, e.g., a commercial partially hydrogenated rosin, to provide a degree of hydrogenation short of complete hydrogenation but sufficient to impart the desired characteristics to the product and so on. Optimum results are obtained with stabilized rosins having low molecular distillation residues, e.g., <1%, low abietic acid contents, e.g., <1%, and acid numbers from about 155 to about 185, preferably from about 160 to about 175.

Any of the well-known methods for preparing these stabilized rosins can be used. For example, a disproportionated rosin suitable for use herein can be prepared by contacting a gum, wood or tall oil rosin at a suitable temperature with an active hydrogenation catalyst in the absence of added hydrogen and at an elevated temperature, until the rosin contains at least about 40% dehydroabietic acid and until less than about 1% of abietic acid remains. Suitable catalysts for effecting this conversion are palladium, platinum, nickel, iodine and so on. The catalyst may be supported on a carrier, such as granular alumina, fibrous asbestos or activated charcoal.

The dehydrogenation or disproportionation with a palladium catalyst, for example, can be conducted either by a batchwise or continuous procedure. Thus, in a batchwise procedure, the rosin may be contacted with from about 0.08% to about 10% by weight, based on the weight of the rosin, of a catalyst consisting of from 1 to 10 parts palladium deposited on 100 parts activated charcoal. The rosin and the catalyst are heated together at about 150° C. to about 300° C. for about 1 to 5 hours. In the continuous process, the molten rosin is flowed over the supported palladium catalyst at a temperature within the range of about 225° C. to about 300° C. for a period of time from about 15 minutes to about 1 hour.

A combined disproportionation and hydrogenation can be carried out by partially hydrogenating rosin as described, for example, in U.S. 2,113,808 and then subjecting the resulting product to iodine treatment. A substantially completely hydrogenated rosin suitable for use herein can be prepared as described in U.S. 2,776,276. Instead of subjecting the partially hydrogenated product prepared, for example, as described in U.S. 2,113,808 to treatment with iodine, the same can be subjected to a further hydrogenation treatment in the presence of suitable catalyst, e.g., a noble metal catalyst such as palladium. The above and other well-known procedures can be used to prepare stabilized rosins suitable for use herein.

The distilled stabilized rosin, prepared as above described, can be converted directly to soaps by reaction with alkali, e.g., alkali metal hydroxides or carbonates, and particularly sodium and potassium hydroxides or carbonates using conventional procedures. These soaps can be formed as dilute aqueous soap solutions or as paste soaps which generally contain from about 60% to about 80% solids depending on the acid number and crystallization tendencies. Sufficient alkali is used to neutralize from about 70% to about 95–100% of the acidity of the distilled stabilized rosin.

While these distilled stabilized rosins can be converted directly to soaps, as above described, it is preferred, for commercial purposes, to first blend them with a substantially neutral oil to provide soaps having improved stability and resistance to crystallization. The term "substantially neutral" is used because oils that are satisfactory for use herein will include materials containing small amounts of acidity due to methods of refining or isolation. In the case of the ester-type oils, acidity may be due to incomplete reaction. The term "substantially neutral," therefore, is intended to include oils which may be somewhat acidic or alkaline as well as those which are actually neutral.

The blend can be prepared in any suitable manner as by adding the oil to the rosin and melting the mixture prior to neutralization or partial neutralization with alkali. The amount of oil will vary depending on the particular oil, the particular distilled stabilized rosin and other factors. In general, the amount of oil should be at least about 3% by weight, based on the weight of distilled stabilized rosin, in order to obtain the desired stability against crystallization, emulsifier quality, and emulsifier economy and not more than about 20% by weight, based on the weight of distilled stabilized rosin, in order to avoid adverse effects on the emulsion polymerization process and to avoid instability of dilute solutions prepared from these soaps. The preferred range of substantially neutral oil is from about 5% to about 12% by weight, based on the weight of rosin. These blends of distilled stabilized rosin and substantially neutral oil will preferably have acid numbers from about 140 to about 165 and most preferably from about 150 to about 160 in order to provide compositions most suitable for use in commercially acceptable emulsifiers.

The above-described blends of distilled stabilized rosin and substantially neutral oil are converted to soaps by neutralization or partial neutralization with an alkali metal compound, basic in nature. Alkali metal compounds generally used for this purpose are the hydroxides and carbonates of sodium and potassium. These compounds are usually added to the blend in aqueous solution and in amounts such as to neutralize from about 70% to about 95–100% of the acidity of the blend. Generally, an amount of the basic compound from about 7% by weight to about 15% by weight, based on the weight of the blend, will be satisfactory. The neutralization reaction can be carried out at temperatures from about 90° C. to about 120° C.

The emulsifiers prepared from blends of distilled stabilized rosin and substantially neutral oil can be prepared as dilute aqueous solutions or dispersions but are usually prepared in the form of pastes containing from about 50% to about 85% by weight, based on the weight of the soap, of solids. These paste soaps are characterized by good stability against crystallization and relatively low viscosity so that they can be readily handled during storage, shipment and use. Moreover, when these soaps are used in aqueous emulsion polymerization processes, the reduction of prefloc formation is of the same order as obtained with soaps prepared directly from the distilled stabilized rosins.

Selection of the substantially neutral oil for use herein is of considerable importance. For optimum results in emulsion polymerization processes, the oil should meet or substantially meet the following requirements: (1) the oil should not substantially decrease the polymerization rate, (2) the oil should be compatible with the paste soap, (3) the oil should be compatible with dilute (2–5%) aqueous solutions of the soaps, (4) the oil should be light colored and have good color stability, (5) the oil should not retard vulcanization of the rubber produced with it, and (6) the oil should not contribute to prefloc formation. In general, it has been found that oils that meet most of the above requirements will contain a maximum of 6% nitrogen bases and a maximum of 6.5% group 1 unsaturates as determined by the Rostler method of analysis (ASTM Tentative Method D2006). These values, however, are not critical and are not to be considered as limiting this invention because oils have been found which fall outside of these limits and yet prove to be usable.

Typical of the oils suitable for use herein are the petroleum-based oils, e.g., naphthenic-based oils, aromatic-based oils and paraffinic-based oils, such as rubber processing or extending oils and/or rubber compounding oils. Usually, oils containing the appropriate mixture of parffins, naphthenes and aromatic compounds, e.g., Gulf 561 Oil, are best. In addition to these, low molecular weight terpene polymers, e.g., turpentine-based polymers such as terpene dimers, trimers, etc., rosin and fatty acid esters, and rosin oils can also be used. These oils, of course, are selected so as to substantially meet all, or at least most, of the above requirements. This pretty much limits the choice of these oils to those that are relatively free of polyunsaturates and phenolic materials. Gulf 561 Oil is comprised of 7% aromatic hydrocarbons, 31% naphthenic hydrocarbons, and 62% paraffin hydrocarbons. This oil has a Saybolt viscosity at 100° F. of 104.2, a Saybolt viscosity at 210° F. of 38.2, a viscosity index of 18, a flash point of 320° F., a fire point of 350° F., a pour point of −60° F., and a neutral value of 0.02 as measured by ASTM D974.

The amount of oil utilized can be varied as previously indicated. If a product is required that can be diluted with cold water to a clear solution, it is desirable to utilize up to about 6% by weight, based on the weight of the total resin composition, of oil. Up to 12–20% of these oils can be used if the product is diluted by the standard procedures for paste rosin size. This procedure involves gradual addition of hot water to the warm product with vigorous agitation. A primary emulsion containing about 16% total solids is formed in this way. This primary emulsion can be diluted further with cold water to give a clear solution of the soap. The pH of this dilute solution can be adjusted with dilute alkali as required without changing the clarity. Mixtures of these oils can also be used to advantage in some cases.

Other materials can be included in the soap formulations of the invention. For example, the replacement of about 3% of the rosin component by partially hydrogenated fatty acids improves the dilutability of these soaps with cold water. Dilute aqueous solutions (2–3%) of these soaps containing small amounts of fatty acids are clear at room temperature and remain clear for several days. Also, when distilled disproportionated rosin is used, it is advantageous to add to the formulation a completely hydrogenated rosin or a partially hydrogenated rosin which has been further treated with iodine or further hydrogenated as hereinbefore described. Replacement of 10-30% of the distilled disproportionated rosin with the distillate from one of these other stabilized rosins improves the crystallization resistance of these paste soaps. In fact, partial replacement of distilled disproportionated rosin with one of these distilled hydrogenated rosins permits the preparation of nonstratifying, gel-free soaps.

In the use of these emulsifiers in emulsion polymerization processes, polymerization mixtures are prepared comprising water, a polymerizable monomer such as a butadiene-1,3 compound and possibly other monomers for interpolymerization therewith, and as emulsifier from about 1.5% to about 15% by weight, based on the weight of monomers, of an alkali metal soap of a distilled stabilized rosin or a blend of same with a neutral oil. The preferred amount of emulsifier is from about 4% to about 6%. Other ingredients are generally used, in accordance with prior art practice, to assist the polymerization, e.g., catalyst, catalyst activator, and so on.

The temperature at which the polymerization according to the present invention is carried out is preferably within the range from about 0° C. to about 70° C., more preferably within the range from about 0° C. to about 10° C.

Specific ingredients and conditions used in aqueous emulsion polymerization processes for the preparation of synthetic rubber are well known in the art and need not be further described herein. For a further detailed description of such processes, reference is made to U.S. 2,569,448 and numerous other patents in this field.

Although, in the above examples, butadiene and styrene copolymers are used as examples of polymers of butadiene-1,3 compounds prepared by emulsion polymerization in accordance with the present invention, it will be appreciated that the invention is applicable to the polymerization of other types of monomers, e.g., copolymers of butadiene and acrylonitrile, copolymers of butadiene and methyl methacrylate, copolymers of isoprene and styrene, polymers of butadiene, chloroprene and isoprene, and so on.

The advantages of using the emulsifiers of this invention in aqueous emulsion polymerization processes are that they permit the preparation of styrene butadiene rubber latexes and similar latexes of improved stability. This permits the processing of these latexes to recover monomers with less difficulty with premature coagulation of the rubber (prefloc formation), thereby permitting the recovery equipment to be operated for longer periods of time without shutting down to clean transfer lines and stripping lines.

While preferred embodiments of the invention have been illustrated and described, the invention is not to be construed as limited thereto except as the same are included in the following claims.

What we claim and desire to protect by Letters Patent is:

1. An emulsifier for use in aqueous emulsion polymerization processes comprising a soap selected from the group consisting of sodium and potassium soaps of a blend of an overhead fraction of a distilled stabilized rosin, said overhead fraction having been derived by subjecting a stabilized rosin to distillation under reduced pressure whereby there is provided an overhead fraction and a high boiling residue fraction, said high boiling residue fraction consisting of from about 3% to 20% by weight of the stabilized rosin, with up to about 20% by weight, based on the weight of the overhead fraction of distilled stabilized rosin, of an oil selected from the group consisting of a naphthenic-based petroleum oil, an aromatic-based petroleum oil, a paraffinic-based petroleum oil, a rosin oil, a terpene polymer, and mixtures thereof.

2. An emulsifier for use in aqueous emulsion polymerization processes comprising a soap selected from the group consisting of sodium and potassium soaps of a blend of an overhead fraction of a distilled disproportionated rosin, said overhead fraction having been derived by subjecting a disproportionated rosin to distillation under reduced pressure whereby there is provided an overhead fraction and a high boiling residue fraction, said high boiling residue farction consisting of from about 3% to 20% by weight of the disproportionated rosin, with up to about 20% by weight, based on the weight of the overhead fraction of distilled disproportionated rosin of an oil selected from the group consisting of a naphthenic-based petroleum oil, an aromatic-based petroleum oil, a paraffinic-based petroleum oil, a rosin oil, a terpene polymer, and mixtures thereof.

3. The emulsifier of claim 2 wherein the oil is a naphthenic-based petroleum oil.

4. The emulsifier of claim 2 wherein the oil is an aromatic-based petroleum oil.

5. The emulsifier of claim 2 wherein the oil is a paraffinic-based petroleum oil.

6. The emulsifier of claim 2 wherein from about 10% to 30% of the overhead fraction of distilled disproportionated rosin is replaced by a distilled substantially completely hydrogenated rosin.

References Cited by the Examiner

UNITED STATES PATENTS

| | | | |
|---|---|---|---|
| 2,271,474 | 1/1942 | Boys | 260—27 |
| 2,434,656 | 1/1948 | Humphrey | 260—27 |
| 2,485,616 | 10/1949 | Long et al. | 260—82.3 |
| 2,569,448 | 10/1951 | Borglin et al. | 260—27 |
| 2,582,264 | 1/1952 | McMillan et al. | 260—31.2 |
| 2,606,842 | 8/1952 | Price | 260—97 |
| 2,685,576 | 8/1954 | Fryling et al. | 260—82.3 |
| 2,752,330 | 6/1956 | Hetzel | 260—82.3 |
| 2,784,165 | 3/1957 | Howland | 260—27 |
| 2,887,475 | 5/1959 | Watkins | 260—107 |

LEON J. BERCOVITZ, *Primary Examiner.*